United States Patent
Lim et al.

(10) Patent No.: US 10,713,833 B2
(45) Date of Patent: Jul. 14, 2020

(54) METHOD AND DEVICE FOR CONTROLLING 3D CHARACTER USING USER'S FACIAL EXPRESSIONS AND HAND GESTURES

(71) Applicant: KOREA INSTITUTE OF SCIENCE AND TECHNOLOGY, Seoul (KR)

(72) Inventors: Hwasup Lim, Seoul (KR); Youngmin Kim, Seoul (KR); Jae-In Hwang, Seoul (KR); Sang Chul Ahn, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 23 days.

(21) Appl. No.: 15/467,269

(22) Filed: Mar. 23, 2017

(65) Prior Publication Data
US 2018/0144530 A1   May 24, 2018

(30) Foreign Application Priority Data
Nov. 18, 2016   (KR) .................. 10-2016-0154440

(51) Int. Cl.
| G06T 13/40 | (2011.01) |
|---|---|
| G06F 3/01 | (2006.01) |
| G06F 3/03 | (2006.01) |
| G06T 7/143 | (2017.01) |
| G06T 7/246 | (2017.01) |
| G06T 7/73 | (2017.01) |

(52) U.S. Cl.
CPC .............. *G06T 13/40* (2013.01); *G06F 3/011* (2013.01); *G06F 3/012* (2013.01); *G06F 3/017* (2013.01); *G06F 3/0304* (2013.01); *G06T 7/143* (2017.01); *G06T 7/246* (2017.01); *G06T 7/73* (2017.01); *G06F 2203/011* (2013.01); *G06T 2207/10028* (2013.01); *G06T 2207/20081* (2013.01); *G06T 2207/30201* (2013.01)

(58) Field of Classification Search
CPC ......... G06T 13/40; G06T 7/143; G06T 7/246; G06T 7/73; G06T 2207/10028; G06T 2207/20081; G06T 2207/30201; G06F 3/012; G06F 3/017; G06F 3/048
See application file for complete search history.

(56) References Cited

U.S. PATENT DOCUMENTS

| 2006/0055699 A1* | 3/2006 | Perlman | ............. G06K 9/00255 |
|---|---|---|---|
| | | | 345/473 |
| 2008/0012866 A1* | 1/2008 | Forbes | .................... G06T 13/40 |
| | | | 345/473 |

(Continued)

FOREIGN PATENT DOCUMENTS

| KR | 10-0753965 B1 | 8/2007 |
|---|---|---|
| KR | 10-2011-0021330 A | 3/2011 |

OTHER PUBLICATIONS

Cutler, Animation, Motion Capture, & Inverse Kinematics, URL: https://www.cs.rpi.edu/~cutler/classes/advancedgraphics/S13/lectures/10_inverse_kinematics.pdf (Year: 2013).*

(Continued)

*Primary Examiner* — Phuc N Doan
(74) *Attorney, Agent, or Firm* — NSIP Law

(57) ABSTRACT

Facial expressions and whole-body gestures of a 3D character are provided based on facial expressions of a user and gestures of a hand puppet perceived using a depth camera.

5 Claims, 7 Drawing Sheets

(56) References Cited

U.S. PATENT DOCUMENTS

| | | | | |
|---|---|---|---|---|
| 2010/0111370 | A1* | 5/2010 | Black | G06K 9/00369 |
| | | | | 382/111 |
| 2013/0100140 | A1* | 4/2013 | Ye | G06T 13/20 |
| | | | | 345/473 |
| 2015/0161809 | A1* | 6/2015 | Murdock | G06T 13/40 |
| | | | | 345/474 |
| 2015/0379752 | A1* | 12/2015 | Li | G06T 13/40 |
| | | | | 715/752 |
| 2016/0005206 | A1* | 1/2016 | Li | H04N 7/157 |
| | | | | 345/474 |
| 2017/0043269 | A1* | 2/2017 | Baker | A63H 3/48 |
| 2017/0294029 | A1* | 10/2017 | Ahn | G06T 7/73 |
| 2018/0144531 | A1* | 5/2018 | Aguado | G06T 13/40 |

OTHER PUBLICATIONS

Kato, A Markov random field image segmentation model for color textured images, Image and Vision Computing vol. 24, Issue 10, Oct. 1, 2006, pp. 1103-1114 (Year: 2006).*

Wang, Practical Color-Based Motion Capture, Eurographics/ACM SIGGRAPH Symposium on Computer Animation (2011) (Year: 2011).*

Kalogerakis, Learning 3D Mesh Segmentation and Labeling, ACM Trans. Graph. 29, 4, Article 102 (Jul. 2010), 12 pages (Year: 2010).*

Shotton, Real-Time Human Pose Recognition in Parts from Single Depth Image, CVPR, pp. 1297-1304 (Year: 2011).*

Held, 3D Puppetry: A Kinect-based Interface for 3D Animation, ACM 2012, pp. 11 (Year: 2012).*

Roditakis, Quantifying the effect of a colored glove in the 3D tracking of a human hand, International Conference on Computer Vision Systems, pp. 404-414 (Year: 2015).*

Geebelen, Real-time hand tracking with a colored glove, 2014 (Year: 2014).*

Oikonomidis, Efficient Model-based 3D Tracking of Hand Articulations using Kinect, BMVC 2011The 22nd British Machine Vision Conference (Year: 2011).*

Tran, Gaussian Mixture Model Based on Hidden Markov Random Field for Color, 2014, URL: https://doi.org/10.1007/978-3-642-41671-2_25, Ubiquitous Information Technologies and Applications, pp. 189-197 (Year: 2014).*

Levine, Continuous Character Control with Low-Dimensional Embeddings, Apr 2012, URL: https://homes.cs.washington.edu/~zoran/ccclde.pdf (Year: 2012).*

Wheatland, Capturing and Animating Hand and Finger Motion for 3D Communicative Characters, UC Riverside Electronic Theses and Dissertations, URL: https://escholarship.org/uc/item/39w9397t (Year: 2016).*

Condell et al., HandPuppet3D: Motion capture and analysis for character animation, Artif Intell Rev (2009) 31:45-59, DOI 10.1007/s10462-009-9126-5 (Year: 2009).*

Luo et al., Building Hand Motion-Based Character Animation: The Case of Puppetry, DOI: 10.1109/CW.2010.24 • Source: IEEE Xplore (Year: 2010).*

Jin et al., Adding Hand Motion to the Motion Capture Based Character Animation, DOI: 10.1007/11595755_3 • Source: DBLP (Year: 2005).*

\* cited by examiner

METHOD AND DEVICE FOR CONTROLLING 3D CHARACTER USING USER'S FACIAL EXPRESSIONS AND HAND GESTURES

CROSS-REFERENCE TO RELATED APPLICATION

This application claims the benefit of Korean Patent Application No. 10-2016-0154440, filed on Nov. 18, 2016, in the Korean Intellectual Property Office, the disclosure of which is incorporated herein in its entirety by reference.

BACKGROUND

1. Field

One or more embodiments relate to the reproduction of expressions and gestures of three-dimensional (3D) characters. The work related to the present disclosure was supported by the Advanced Convergence Contents Technology Development Program conducted as part of the Market-friendly Digital Contents R&D Program of the Korean Ministry of Science, ICT, & Future Planning [Project No: R01151510020002003, Project Title: User Interactive Animation Production Open-Platform Service].

2. Description of the Related Art

Recently, users participate in the production of animations and game contents, and interactive contents reflecting facial expressions or gestures of users have come to the fore. Such interactive contents may provide a friendlier and more immersive environment because users or characters drawn by users are key characters and user's facial expressions or gestures are reflected in the key characters.

In a method of the related art, a toy is 3D scanned to create a 3D model, and the rotation and position of the 3D model are traced using a depth camera. However, it is difficult to apply this method to articulated bodies such as humans. In another method, a 3D character model is animated by measuring the angle of each joint of an articulated robot similar to a human body while moving the articulated robot by hand. However, this method also has limitations because articulated robots are expensive and there is a limit to reproducing a continuous gesture. In addition, there is a method of using markers on an articulated doll similar to a human. However, this method may have errors such as an error occurring when a marker is hidden from sight.

Currently, devices such as a keyboard or a joystick are used to control expressions and motions of 3D characters. However, if a keyboard or joystick is used, although preset gestures are easily generated, it is difficult to generate various expressions or motions of a 3D character reflecting user's expressions or gestures.

In another method, when a user moves his/her whole body, 3D character motions corresponding to the user's movements may be generated using Kinect motion capture technology. However, this method requires users to move their whole bodies, and a large spacious area is needed for whole-body movements of users.

RELATED ART DOCUMENT

Patent Document

KR 10-0753965 B1

SUMMARY

According to one or more embodiments, expressions and motions of a three-dimensional (3D) character are controlled based on user's facial expressions and hand motions.

According to one or more embodiments, a whole-body gesture of a 3D character is generated, based on positions of key parts of a hand puppet, by using a machine learning method using inverse kinematics or nonlinear mapping, and a facial expression of the 3D character is produced based on a user's facial expression by using a machine learning method and a model matching method.

Additional aspects will be set forth in part in the description which follows and, in part, will be apparent from the description, or may be learned by practice of the presented embodiments.

According to one or more embodiments, there is provided a method of controlling a 3D character using user's facial expressions and hand gestures, the method including: perceiving a user's facial expression based on characteristic points extracted from an image of the user's face captured using a depth camera, and matching the perceived facial expression to a facial expression of the 3D character; and generating a 3D posture of the 3D character based on depth images of a hand puppet captured using the depth camera, wherein the depth images of the hand puppet vary according to user's hand motions and include position information about key parts of the hand puppet, and the position information about the key parts of the hand puppet includes 3D coordinate information about each of a face, both hands, abdomen, and both feet of the hand puppet and information about median values of the key parts of the hand puppet derived from the 3D coordinate information.

The position information about the key parts of the hand puppet may be recognized by painting the face, both hands, abdomen, and both feet of the hand puppet and a remaining region of the hand puppet with different colors, capturing various gestures of the hand puppet using the depth camera, and learning motions of the face, both hands, abdomen, both feet, and remaining region of the hand puppet by using a machine learning method using a Markov Random Field (MRF)-based color region separation technique.

The 3D posture of the 3D character may be inferred and generated using the position information about the key parts of the hand puppet and inverse kinematics.

The 3D posture of the 3D character may be inferred and generated using the position information about the key parts of the hand puppet by a low dimensional-high dimensional nonlinear mapping method.

According to one or more embodiments, there is provided a method of controlling a 3D character using user's facial expressions and hand gestures, the method including: detecting position information about key parts of a hand puppet from depth images captured using a depth camera by using a machine learning method; and generating a 3D posture of the 3D character based on the detected position information about the key parts of the hand puppet, wherein the position information about the key parts of the hand puppet includes 3D coordinate information about each of a face, both hands, abdomen, and both feet of the hand puppet.

According to one or more embodiments, there is provided a device for controlling a 3D character using user's facial expressions and hand gestures, the device including: a 3D character expression matching unit configured to perceive a user's facial expression based on characteristic points extracted from an image of the user's face captured using a depth camera, and match the perceived facial expression to a facial expression of the 3D character; and a 3D character posture matching unit configured to generate a 3D posture of the 3D character based on depth images of a hand puppet captured using the depth camera, wherein the depth images of the hand puppet vary according to user's hand motions, the depth images include position information about key parts of the hand puppet, and the position information about the key parts of the hand puppet includes 3D coordinate information about each of a face, both hands, abdomen, and both feet of the hand puppet and information about median values of the key parts of the hand puppet derived from the 3D coordinate information.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
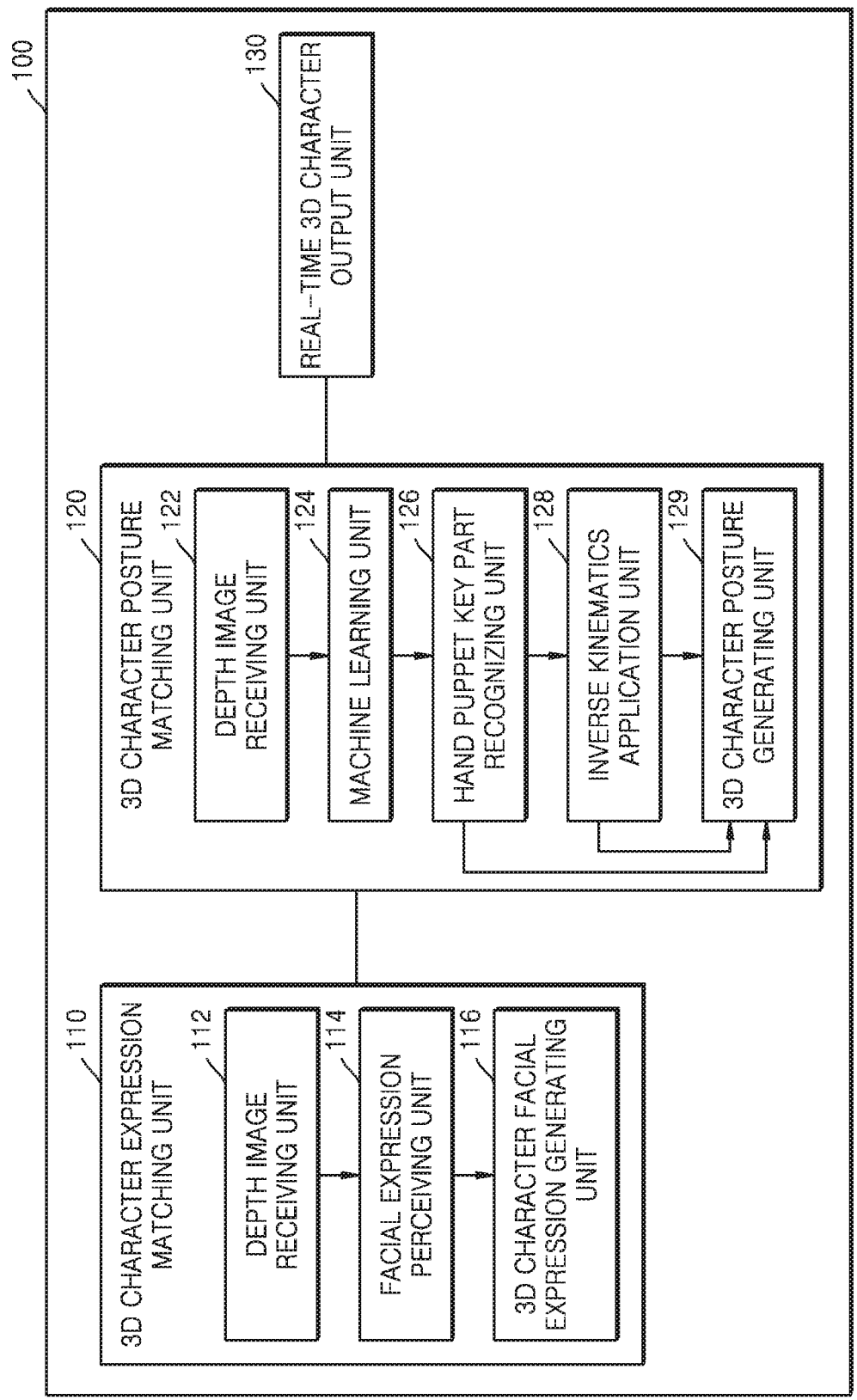
FIG. 1 illustrates an internal structure of a control device for controlling a three-dimensional (3D) character by using user's facial expressions and hand gestures, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

According to embodiments, facial expressions and whole-body gestures of a three-dimensional (3D) character are generated based on facial expressions of a user and gestures of a hand puppet perceived using a depth camera. In a method according to an embodiment, the position of each part of a hand puppet may be traced without using markers so as to generate whole-body gestures of a 3D character, and the facial expression of a user may be traced so as to produce facial expressions of a 3D character.

To this end, according to an embodiment, a small depth camera may be used together with any one of a personal computer (PC), a terminal, a tablet, a smartwatch, a smartphone, and a hand-held device.

FIG. 1 illustrates an internal structure of a control device 100 for controlling a 3D character by using user's facial expressions and hand gestures, according to an embodiment.

The control device 100 includes a 3D character expression matching unit 110, a 3D character posture matching unit 120, and a real-time 3D character output unit 130.

The 3D character expression matching unit 110 of the control device 100 may perceive a user's facial expression based on characteristic points extracted from an image of the user's face captured using a depth camera and may match the perceived facial expression to a facial expression of a 3D character. Refer to an embodiment shown in FIGS. 5A to 5C and FIGS. 6A to 6C.

The 3D character posture matching unit 120 of the control device 100 may generate a 3D posture of a 3D character based on depth images of a hand puppet captured using the depth camera. Refer to the embodiment shown in FIGS. 5A to 5C and 6A to 6C.

Figure 5A:
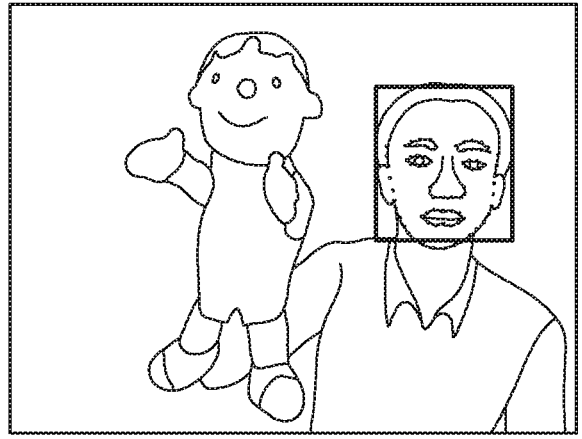
FIGS. 5A to 6C illustrate an example of recognizing position information about key parts of a hand puppet according to variations in an expression and hand gesture of a user by using a machine learning method and of generating an expression and a posture of a 3D character corresponding to the position information, according to an embodiment.
Figure 5B:
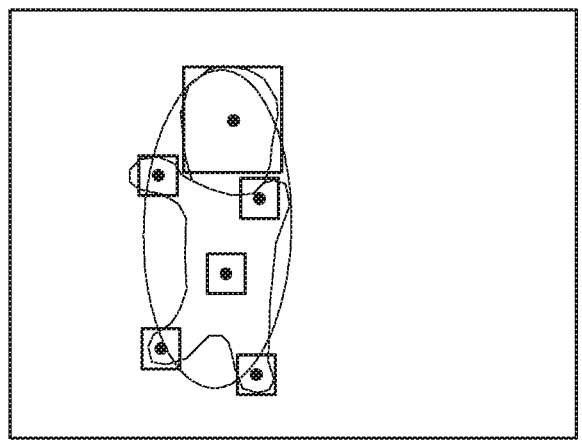
Figure 5C:
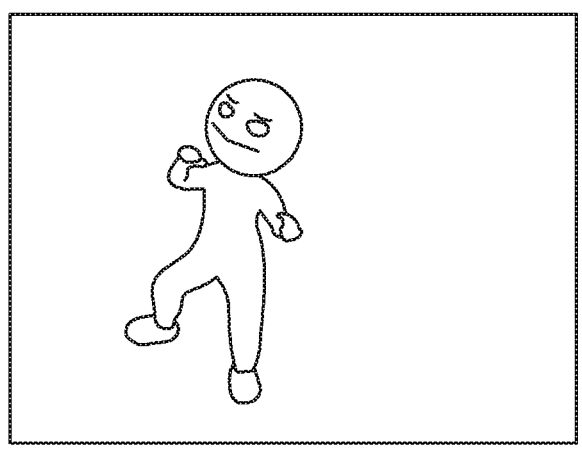
Figure 6A:
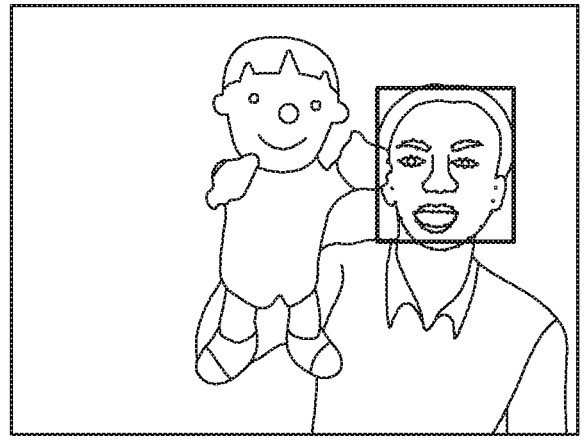
Figure 6B:
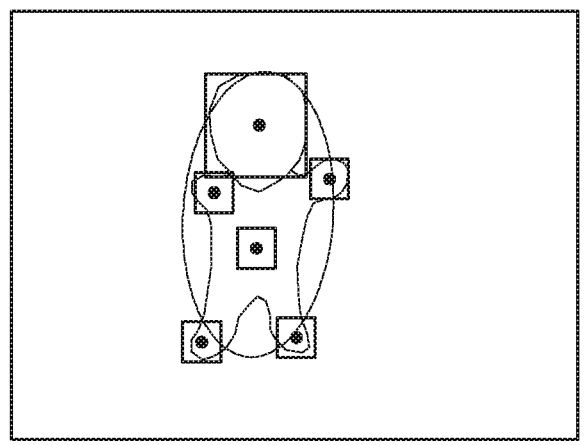
Figure 6C:
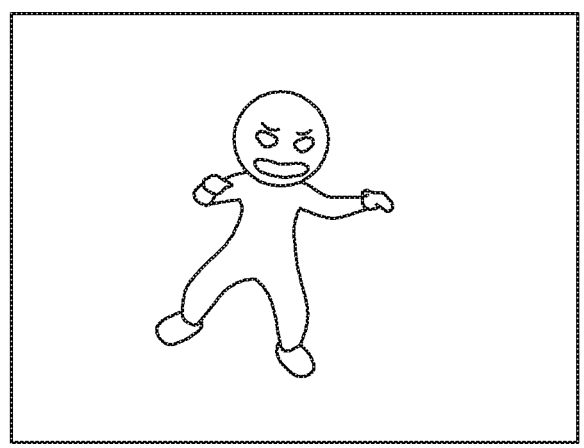

If the facial expression and hand gesture of the user are changed, the real-time 3D character output unit 130 changes the facial expression and posture of the 3D character in real time as shown in FIGS. 5C and 6C.

According to an embodiment, the 3D character expression matching unit 110 includes: a depth image receiving unit 112 configured to receive depth images from the depth camera; a facial expression perceiving unit 114 configured to perceive a user's facial expression by extracting characteristic points of a user's face from the depth images; and a 3D character facial expression generating unit 116 configured to match the perceived user's facial expression to a 3D character.

According to an embodiment, the 3D character posture matching unit 120 includes: a depth image receiving unit 122 configured to receive depth images from the depth camera; a machine learning unit 124 configured to learn to detect key parts of the hand puppet such as the face, both hands, abdomen, or both feet of the hand puppet from the depth images; a hand puppet key part recognizing unit 126 configured to recognize the key parts of the hand puppet such as the face, both hands, abdomen, or both feet of the hand puppet from the depth images; an inverse kinematics application unit 128 configured to apply inverse kinematics to a 3D character based on the recognized key parts of the hand puppet; and a 3D character posture generating unit 129 configured to generate a posture of the 3D character based on calculated angles and key joint positions of the 3D character recognized by the application of inverse kinematics.

Figure 2:
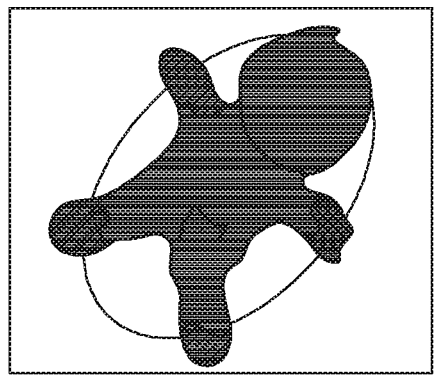
FIG. 2 illustrates an example of calculating median values of key parts of a hand puppet and perceiving a rotation axis of the hand puppet, according to an embodiment.
Figure 2:
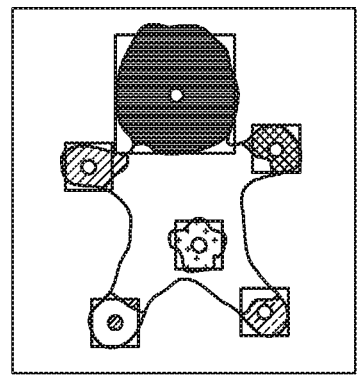
Figure 3A:
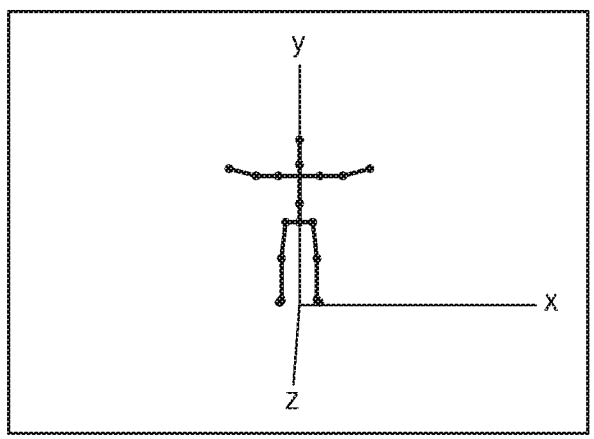
FIGS. 3A to 4B illustrate an example of setting the positions and angles of all joints of a 3D character by using 3D position information about key parts of a hand puppet and inverse kinematics, according to an embodiment.
Figure 3B:
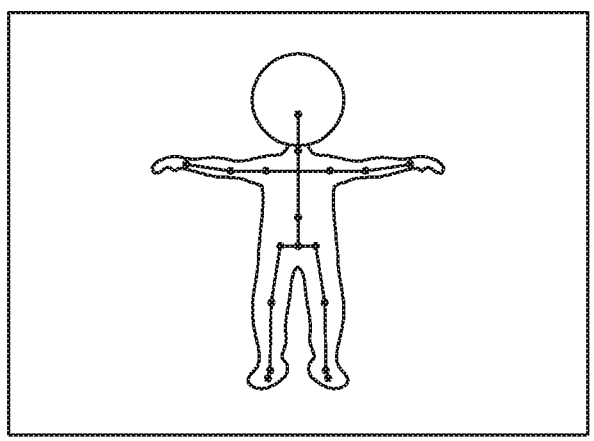
Figure 4A:
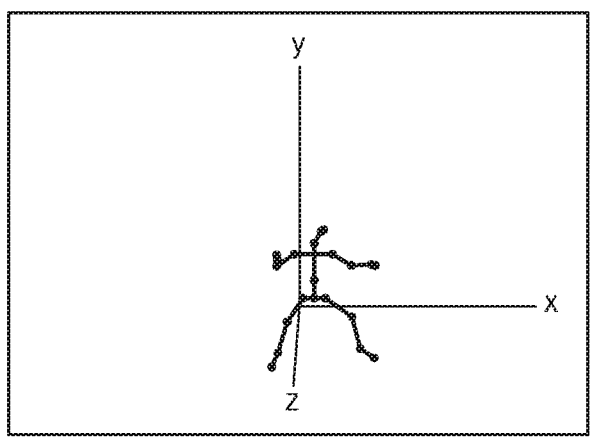
Figure 4B:
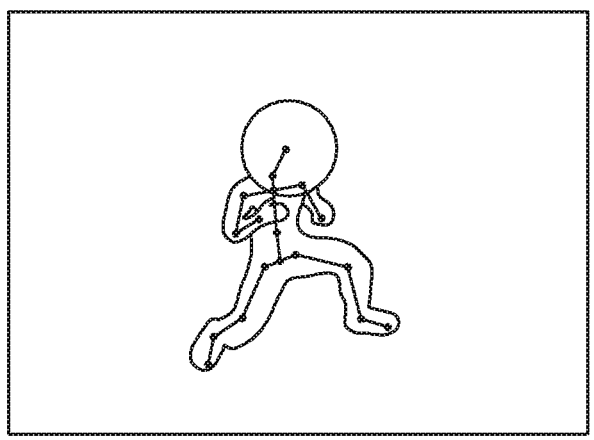

According to an embodiment, as shown in FIG. 2, the machine learning unit 124 may take a video of a hand puppet of which key parts and a remaining region are painted with particular colors to capture various gestures of the hand puppet, and then may allocate labels to regions of the hand puppet by applying a Markov Random Field (MRF)-based color region separation technique to the video. Thereafter, the key parts of the hand puppet such as the face, both hands, abdomen, or both feet of the hand puppet may be recognized by a random forest machine learning method in which a set of differences between depth values of two random points is determined as a feature vector like in a Kinect motion capture technique (Jamie Shotton et al., CVPR 2011). In this process, median values of the key parts of the hand puppet may be calculated, and a rotation axis of the hand puppet may be perceived. According to an embodiment, 3D coordinates of the key parts of the hand puppet may be inferred from the calculated median values of the key parts of the hand puppet.

According to an embodiment, as shown in FIGS. 3A to 4B, the inverse kinematics application unit 128 may set positions and angles of all joints of a 3D character by using inverse kinematics.

Forward kinematics may be referred to as a process of calculating the positions and postures of end effectors in a Cartesian coordinate system from a series of given joint angles. According to an embodiment, the inverse kinematics application unit 128 uses inverse kinematics opposite to forward kinematics so as to express spatial motions of joints using end-effector positions. According to an embodiment, the 3D character posture generating unit 129 may use inverse kinematics to generate a posture of the 3D character corresponding to a posture of the hand puppet. However, this embodiment is merely an example. For example, a low dimensional-high dimensional nonlinear mapping method may be additionally used to generate a high dimensional whole-body gesture of the 3D character from low dimensional positions of the key parts of the hand puppet.

FIGS. 5A to 5C and 6A to 6C illustrate an example of reflecting variations in the facial expression of the user and the posture of the hand puppet in the 3D character in real time, according to an embodiment.

Figure 7:
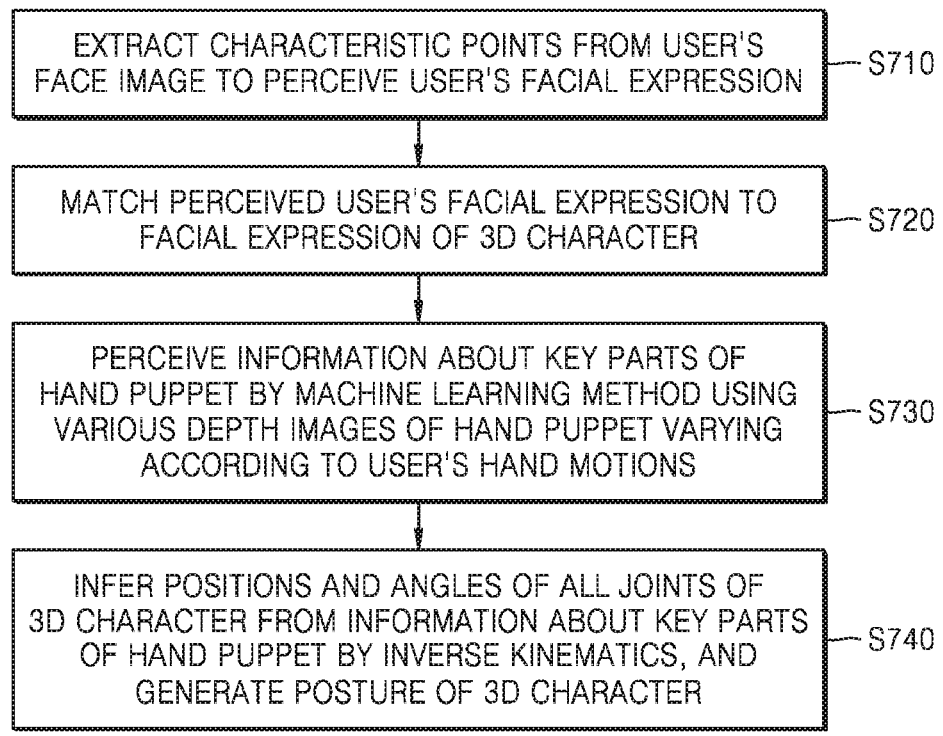
FIG. 7 is a flowchart illustrating a method of controlling a 3D character by using user's facial expressions and hand gestures, according to an embodiment.

FIG. 7 is a flowchart illustrating a method of controlling a 3D character using user's facial expressions and hand gestures, according to an embodiment.

That is, a method of controlling a 3D character using user's facial expressions and hand gestures is provided, according to an embodiment.

A device for controlling a 3D character using user's facial expressions and hand gestures may extract characteristic points from an image of the user's face captured using a depth camera so as to perceive a facial expression of the user (S710). The perceived facial expression of the user may be matched to a facial expression of a 3D character (S720).

Thereafter, various postures of a hand puppet made by hand motions of the user may be recognized from depth images received from the depth camera by a machine learning method, so as to perceive information about key parts including 3D coordinate information about each of the face, both hands, abdomen, and both feet of the hand puppet (S730).

After perceiving information about the key parts of the hand puppet, the positions and angles of all joints of the 3D character are inferred from the information by inverse kinematics so as to generate a posture of the 3D character corresponding to the posture of the hand puppet varied according to a hand motion of the user (S740).

The inventive concept may also be embodied as computer readable codes on a non-transitory computer readable recording medium. The non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage. The non-transitory computer readable recording medium can also be distributed over network coupled computer systems so that the computer readable code is stored and executed in a distributed fashion.

As described above, according to one or more of the above embodiments, the method and device for controlling a 3D character using user's facial expressions and gestures do not use additional mechanical devices other than a depth camera and a hand puppet.

In addition, according to the one or more of the above embodiments, the position of each part of a hand puppet may be traced without using markers, so as to generate a whole-body gesture of a 3D character.

Furthermore, according to the one or more of the above embodiments, variations in the facial expression of a user may be reflected in a 3D character to increase interactivity between the user and the 3D character and provide an immersive environment in which expressions and gestures of the user are naturally reproduced without pauses.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A method of controlling a three-dimensional (3D) character using a user's facial expressions and hand gestures, the method comprising:

perceiving the user's facial expression based on characteristic points extracted from an image of the user's face captured using a depth camera;

matching the perceived facial expression to a facial expression of the 3D character and matching the hand gestures to the 3D character; and detecting position information about key parts of a physical hand puppet from a depth image of the physical hand puppet captured using the depth camera, the position information comprising 3D coordinate information about each of key parts of the physical hand puppet and information about median values of the key parts of the physical hand puppet derived from the 3D coordinate information; and generating a 3D posture of the 3D character based on the position information about the key parts of the physical hand puppet, wherein the position information about key parts of the physical hand puppet vary according to the user's hand motions, wherein the generating of the 3D posture of the 3D character comprises:

applying inverse kinematics to the 3D character based on the key parts of the captured depth image of the physical hand puppet to set angles and positions of joints of the 3D character; and applying low dimensional-high dimensional mapping to generate body gestures of the 3D character, and wherein the detecting of the position information about the key parts that are in different colors and including a face, both hands, an abdomen and both feet of the physical hand puppet, comprises:

capturing various gestures of the physical hand puppet using the depth camera; and learning motions of the key parts and a remaining region of the physical hand puppet by using a machine learning method using a color region separation technique.

2. The method of claim 1,
wherein the color region separation technique is a Markov Random Field (MRF)-based color region separation technique.

3. The method of claim 1, wherein the 3D posture of the 3D character is generated by inferring positions and rotation angles of all joints of the 3D character from the position information about the key parts of the physical hand puppet, by using the inverse kinematics.

4. A device for controlling a 3D character using a user's facial expressions and hand gestures, the device comprising:
a 3D character expression matching control device configured to perceive the user's facial expression based on characteristic points extracted from an image of the user's face captured using a depth camera, match the perceived facial expression to a facial expression of the 3D character, and match the hand gestures to the 3D character; and
a 3D character posture matching control device configured to generate and display a 3D posture of the 3D character based on depth images of a physical hand puppet captured using the depth camera,
wherein the depth images of the physical hand puppet vary according to the user's hand motions and comprise position information about key parts of the physical hand puppet,
wherein the position information about the key parts of the physical hand puppet comprises 3D coordinate information about each of the key parts of the physical hand puppet and information about median values of the key parts of the physical hand puppet derived from the 3D coordinate information,
wherein the 3D character posture matching control device is further configured to:
apply inverse kinematics to the 3D character based on the key parts of the captured image of the physical hand puppet to set angles and positions of joints of the 3D character; and
apply low dimensional-high dimensional mapping to generate body gestures of the 3D character, and
wherein the 3D character posture matching control device is further configured to detect the position information about the key parts that are in different colors and including a face, both hands, an abdomen and both feet of the physical hand puppet, by:
capturing various gestures of the physical hand puppet using the depth camera; and
learning motions of the key parts of the physical hand puppet and the remaining region of the physical hand puppet by using a machine learning method using a color region separation technique.

5. The device of claim 4,
wherein the color region separation technique is a Markov Random Field (MRF)-based color region separation technique.

\* \* \* \* \*